(12) United States Patent
Yamamoto

(10) Patent No.: US 8,202,825 B2
(45) Date of Patent: Jun. 19, 2012

(54) SOLID LUBRICANT AND SLIDING MEMBER

(75) Inventor: Yoshiaki Yamamoto, Kanagawa-ken (JP)

(73) Assignee: Oiles Corporation, Tokyo (JP)

( * ) Notice: Subject to any disclaimer, the term of this patent is extended or adjusted under 35 U.S.C. 154(b) by 325 days.

(21) Appl. No.: 12/439,858

(22) PCT Filed: Sep. 4, 2007

(86) PCT No.: PCT/JP2007/000954
§ 371 (c)(1),
(2), (4) Date: Oct. 13, 2009

(87) PCT Pub. No.: WO2008/029510
PCT Pub. Date: Mar. 13, 2008

(65) Prior Publication Data
US 2010/0048433 A1  Feb. 25, 2010

(30) Foreign Application Priority Data
Sep. 6, 2006  (JP) ................................ 2006-241959

(51) Int. Cl.
*C10M 111/00*  (2006.01)
*C10M 169/00*  (2006.01)

(52) U.S. Cl. ........ 508/106; 508/181; 508/232; 508/258; 508/450; 508/451; 508/459; 508/551

(58) Field of Classification Search ................... 508/181, 508/419, 421, 431, 433, 446, 447, 448, 450, 508/451, 550, 552, 556, 561, 578, 106, 232, 508/258, 459, 551
See application file for complete search history.

(56) References Cited

U.S. PATENT DOCUMENTS
2006/0063684 A1 * 3/2006 Yamamoto ............. 508/181

FOREIGN PATENT DOCUMENTS

| | | |
|---|---|---|
| EP | 1 586 623 A1 | 10/2005 |
| GB | 1 104 483 A | 2/1968 |
| JP | 60-144351 | 7/1985 |
| JP | 8-283494 | 10/1996 |
| JP | 08-283494 | 10/1996 |
| JP | 2002-138196 | 5/2002 |
| WO | 2004/046285 | 6/2004 |
| WO | WO 2004/046285 | 6/2004 |
| WO | 2004/101718 | 11/2004 |
| WO | WO 2004/101718 | 11/2004 |

OTHER PUBLICATIONS

International Search Report for PCT/JP2007/000954, mailed Dec. 11, 2007.
Extended European Search Report in EP 07 80 5809 dated Nov. 2, 2010.

* cited by examiner

*Primary Examiner* — Ellen McAvoy
*Assistant Examiner* — Taiwo Oladapo
(74) *Attorney, Agent, or Firm* — Nixon & Vanderhye P.C.

(57) ABSTRACT

There are provided a solid lubricant having an island-and-sea structure, which, with the sea phase strengthened, remains free of troubles such as chipping even in use under high load conditions, and a sliding member having the solid lubricant embedded therein. The solid lubricant comprises 1 to 10% by volume of a polyethylene resin, 20 to 60% by volume of a hydrocarbon-based wax, 10 to 60% by volume of melamine cyanurate, 5 to 15% by volume of a polyamide resin, and 2 to 10% by volume of a modified polyethylene resin. The sliding member has the solid lubricant embedded in pores or grooves formed in a sliding surface of the sliding member body.

10 Claims, No Drawings

SOLID LUBRICANT AND SLIDING MEMBER

This application is the U.S. national phase of International Application No. PCT/JP2007/000954, filed 4 Sep. 2007, which designated the U.S. and claims priority to Japanese Patent Application No. 2006-241959, filed 6 Sep. 2006, the entire contents of each of which are hereby incorporated by reference.

TECHNICAL FIELD

The present invention relates to a solid lubricant and a sliding member, more particularly, to a solid lubricant which remains free from troubles such as chipping even in use under high-load conditions, and a sliding member in which the solid lubricant is embedded.

BACKGROUND ART

For the solid lubricants which are, in use, embedded in pores or grooves formed in a bearing sliding surface, it is desired that such solid lubricants can be easily introduced to a bearing sliding surface through sliding contact with a mating member (such as rotating shaft) for forming there a strong solid lubricant film, and that the formed film be capable of enduring repeated frictional contact for a long time and also exhibit an excellent self-repairing ability should a break be produced in the film. As such solid lubricants, there are popularly used those containing graphite as a main component, thanks to the following advantageous properties of the graphite. The graphite, because of its lamellar crystal structure, exhibits a large resistivity in the direction of load applied thereto, but exhibits a small resistivity in the sliding direction. Furthermore, the graphite is soft and able to maintain good lubrication performance over a broad temperature range of from an ordinary temperature to a high temperature.

The solid lubricant containing graphite as a main component, however, is not only rather insufficient in film forming capability, but also unsatisfactory in film life when repeatedly exposed to frictional contact, so that it has the problem that the sliding members (bearings) applied with the lubricant film are subject to restrictions regarding their use conditions and can hardly stand use under high-load conditions.

As other solid lubricants, there has been proposed a solid lubricant comprising lead, a polytetrafluoroethylene resin, a polyolefinic resin and a wax. (See, for instance, Patent Document 1.) This solid lubricant can meet substantially all of the conditions required for the solid lubricants; it is very low in coefficient of friction under the high-load conditions, has excellent film-forming capability, can provide a film with a long service life, and exhibits a high self-repairing ability for the film. In line with the recent trend toward larger size and higher performance of the machines and apparatus, however, further improvement of loading endurance and improvement of friction and wear properties are required of the sliding members having a solid lubricant embedded therein.

From another viewpoint, it is noted in recent years that the tendency of the development of material is obliged to give considerations to the environmental problems, and there is posed the problem that although lead is a material that makes it possible to meet all of the requirements for the solid lubricants, its use is still limited as lead is an environmental loading material.

In view of the above circumstances, the present applicant had previously proposed a solid lubricant comprising a polyethylene resin, a hydrocarbon-based wax and melamine cyanurate. (See, for instance, Patent Document 2.) This solid lubricant is free of lead, which is an environmental loading material, in its composition and exhibits the friction and wear properties identical to or better than those of the conventional lead-containing solid lubricants, and this has presented a certain solution to the above problem. In the ensuing experiments, however, there has been raised a new problem. This solid lubricant has an "island-and-sea" structure in which a sea phase (continuous phase) is formed by a polyethylene resin and a hydrocarbon-based wax, and an insular phase (dispersion phase) of melamine cyanurate is dispersed in the sea phase. In a sliding test conducted with this solid lubricant embedded in pores formed in the body of a sliding member, there took place an expansion and softening of the solid lubricant under the influence of frictional heat generated at the sliding surface, and the solid lubricant was caused to make a plastic flow as a result of subjection to repeated frictional contact in this state, consequently causing loss of part of the solid lubricant.

Patent Document 1: Japanese Patent Publication (KOKOKU) No.

Patent Document 2: International Publication WO2004/046285

DISCLOSURE OF THE INVENTION

Problem to be Solved by the Invention

The present invention has been attained on the basis of the above findings, and its object is to provide a solid lubricant having an island-and-sea structure with its sea phase strengthened to eliminate the possibility of causing troubles such as chipping of the lubricant even in use under high load conditions, and a sliding member having this solid lubricant embedded therein.

Means for Solving the Problem

As a result of concentrated studies for solving the above problem, the present inventors have given attention to a polyamide resin having self-lubricating properties and found that it is possible to solve the above problem by incorporating a compatibilizing agent in both polyamide resin and sea phase to enhance their compatibility while coupling the polyamide resin to the sea phase to strengthen the sea phase.

In a first aspect of the present invention, there is provided a solid lubricant comprising 1 to 10% by volume of a polyethylene resin, 20 to 60% by volume of a hydrocarbon-based wax, 10 to 60% by volume of melamine cyanurate, 5 to 15% by volume of a polyamide resin, and 2 to 10% by volume of a modified polyethylene resin.

In a second aspect of the present invention, there is provided a sliding member having the above solid lubricant embedded in pores or grooves formed in the sliding surface of the sliding member body.

Effect of the Invention

According to the present invention, there is provided a solid lubricant having characteristically an "island-and-sea" structure in which a sea phase is formed by a combination of a polyethylene resin and a hydrocarbon-based wax, and an insular phase of melamine cyanurate is dispersed in the sea phase. Compatibility of this sea phase and the polyamide resin is elevated by incorporation of a modified polyethylene resin serving as a compatibilizing agent while the polyamide resin is coupled with the sea phase to strengthen this phase to realize an enhancement of mechanical strength of the lubricant, thereby allowing the solid lubricant to display stabilized sliding performance without causing troubles such as chipping even in use under high load conditions. Also provided in the present invention is a sliding member having the above solid lubricant embedded therein.

BEST MODE FOR CARRYING OUT THE INVENTION

The present invention is described in detail below. The solid lubricant according to the present invention is one which, in use, is preferably embedded in pores or grooves formed in a sliding surface of a sliding member body, and comprises 1 to 10% by volume of a polyethylene resin, 20 to 60% by volume of a hydrocarbon-based wax, 10 to 60% by volume of melamine cyanurate, 5 to 15% by volume of a polyamide resin, and 2 to 10% by volume of a modified polyethylene resin. The solid lubricant of the present invention has a so-called island-and-sea structure which usually consists of a sea phase comprising a polyethylene resin, a hydrocarbon-based wax, a polyamide resin and a modified polyethylene resin, and an insular phase of melamine cyanurate which is dispersed in the sea phase.

In the solid lubricant of the present invention, the polyethylene resin functions as a binder to take a part in forming the sea phase. The polyethylene resins usable in the present invention may include low density polyethylene resins (LDPE), linear low density polyethylene resins (LLDPE), very low density polyethylene resins (VLDPE), medium density polyethylene resins (MDPE), high density polyethylene resins (HDPE), high molecular weight polyethylene resins (HMWPE), and ultra high molecular weight polyethylene resins (UHMWPE).

Examples of the commercial products of these polyethylene resins may include "Hi-ZEX"™, a high density polyethylene resin", "Hi-ZEX MILLION"™, an ultra high molecular weight polyethylene resin", "LUBMER™, a high molecular weight polyethylene resin", all produced by Mitsui Chemical Co., Ltd; "Hostalene™, an ultra high molecular weight polyethylene resin" produced by Hoechst, Ltd.; and "FLO-THENE"™, a low density polyethylene resin" produced by SUMITOMO SEIKA CHEMICALS CO., LTD. These polyethylene resins may be used singly or in the form of a mixture of any two or more thereof.

The amount of polyethylene resin blended is from 1 to 10% by volume, preferably from 3 to 7% by volume. When the amount of polyethylene resin blended is less than 1% by volume, it may fail to sufficiently show the intended action as a binder. When the amount of polyethylene resin blended exceeds 10% by volume, it is difficult to obtain a good sliding performance.

In the solid lubricant of the present invention, the hydrocarbon-based wax forms the sea phase in combination with the above polyethylene resin in the solid lubricant of the island-and-sea structure, and is mainly intended to provide low friction characteristics to the solid lubricant. The hydrocarbon-based waxes usable in the present invention may include paraffinic waxes having generally not less than 24 carbon atoms, polyethylene waxes having generally not less than 26 carbon atoms, alkylbenzenes having generally not less than 28 carbon atoms, and micro crystalline waxes. These hydrocarbon-based waxes may be used singly or in the form of a mixture of any two or more thereof.

The amount of hydrocarbon-based waxes blended is from 20 to 60% by volume, preferably from 25 to 45% by volume. When the amount of the waxes is less than 20% by volume, the resultant solid lubricant may fail to show the aimed low friction characteristics. When the amount of the waxes exceeds 60% by volume, the resultant solid lubricant tends to be not only lowered in strength but also deteriorated in moldability.

In the solid lubricant of the present invention, melamine cyanurate is an adduct of melamine with cyanuric acid or isocyanuric acid, and it has such a structure that the melamine molecules having a 6-membered ring structure and cyanuric acid (or isocyanuric acid) molecules having a 6-membered ring structure are arranged in plane through a hydrogen bond to form overlapped layers bonded to each other by a weak bonding force. So, the melamine cyanurate shows a cleavage property similar to molybdenum disulfide or graphite. This melamine cyanurate constitutes the insular phase dispersed in the sea phase, and has particularly an effect of improving a wear resistance and a load-carrying capacity of the solid lubricant.

The amount of the melamine cyanurate blended is from 10 to 60% by volume, preferably from 20 to 50% by volume. When the amount of melamine cyanurate blended is less than 10% by volume, it may be difficult to obtain the aimed effect of enhancing a wear resistance and a load-carrying capacity. When the amount of the melamine cyanurate blended exceeds 40% by volume, the resultant solid lubricant may rather deteriorate in wear resistance.

The polyamide resin in the solid lubricant of the present invention is compatibilized with a modified polyethylene resin which serves as a compatibilizing agent as further explained later to form the sea phase and strengthen the formed sea phase. This polyamide resin also has an effect of improving wear resistance while enhancing mechanical strength of the produced solid lubricant. As the polyamide resin, preferably polylauryl lactam (nylon-12) and/or polyundecaneamide (nylon-11) are used.

The amount of the polyamide resin blended is from 5 to 15% by volume, preferably from 7 to 12% by volume. When the amount of the polyamide resin blended is less than 5% by volume, it may be unable to produce the aimed effect of sufficiently strengthening the sea phase. When the amount of the polyamide resin blended exceeds 15% by volume, the resultant solid lubricant may be deteriorated in wear resistance.

The modified polyethylene resin used in the solid lubricant of the present invention serves as a compatibilizing agent for promoting compatibilization of the polyethylene resin and the hydrocarbon-based wax, which form the sea phase, with the polyamide resins (nylon-12 and nylon-11). This modified polyethylene resin also has an effect of enhancing bonding force between the polyethylene resin and hydrocarbon-based wax and the polyamide resins (nylone-12 and nylone-11) to strengthen the sea phase. As the modified polyethylene resin, preferably a graft modified polyethylene resin obtained by graft polymerizing a graft monomer to a polyethylene resin is used.

As the polyethylene resin in the graft modified polyethylene resin, there can be used any of the afore-mentioned low density polyethylenes, linear low density polyethylenes, very low density polyethylenes, medium density polyethylenes, high density polyethylenes, high molecular weight polyethylenes and ultra high molecular weight polyethylenes.

As the graft monomers, there are exemplified α,β-unsaturated carboxylic acids, α,β-unsaturated carboxylic anhydrides, α,β-unsaturated carboxylic acid derivatives, and mixtures of two or more of them. Examples of the α,β-unsaturated carboxylic acids, their anhydrides or derivatives usable as the graft monomers may include monobasic carboxylic acids such as acrylic acid, methacrylic acid and crotonic acid, dibasic carboxylic acids such as maleic acid, fumaric acid, itaconic acid and citraconic acid, and anhydrides or salts of these acids. Preferred among these monomers are acrylic acid, methacrylic acid, maleic anhydride, itaconic anhydride, and their zinc salts or sodium salts, with maleic anhydride and itaconic anhydride being especially preferred.

Examples of the modified polyethylene resins may include "ADMER"™ produced by Mitsui Chemicals, Inc., and "Modic-AP"™ produced by Mitsubishi Chemicals, Inc. The amount of modified polyethylene resin blended is from 2 to 10% by volume, preferably from 4 to 7% by volume. When the amount of modified polyethylene resin blended is less than 2% by volume, it is unable to provide the aimed effect of compatibilizing the polyamide resin with the polyethylene resin and hydrocarbon-based wax, which form the sea phase, and combining them to strengthen the sea phase. When the amount of modified polyethylene resin blended exceeds 10% by volume, the sliding characteristics of the sea phase may deteriorate.

In the solid lubricant comprising a polyethylene resin, a hydrocarbon-based wax, melamine cyanurate, a polyamide resin and a modified polyethylene resin described above, there can be blended a higher fatty acid, a higher fatty acid ester, a higher fatty acid amide, a metallic soap, a phosphate and a polytetrafluoroethylene resin in the prescribed ratios as the additional components.

The fatty acids, higher fatty acid esters and higher fatty acid amides that can be blended as the additional components are helpful for forming the sea phase and also have the effect of improving moldability while decreasing a coefficient of friction of the obtained lubricant. These additional component materials can be used singly or in the form of a mixture of any two or more of them.

The higher fatty acids used in the present invention are the saturated or unsaturated fatty acids having preferably not less than 12 carbon atoms. Examples of such higher fatty acids may include lauric acid, myristic acid, palmitic acid, stearic acid, arachic acid, behenic acid, cerotic acid, montanic acid, mellitic acid, lauroleic acid, myristoleic acid, oleic acid, elaidic acid, linoleic acid, linolenic acid, arachidonic acid, gadoleic acid, and erucic acid.

The higher fatty acid esters are the esters of the above-mentioned higher fatty acids and monohydric or polyhydric alcohols. Examples of the monohydric alcohols may include caprylic alcohol, lauryl alcohol, myristyl alcohol, palmityl alcohol, stearyl alcohol and behenyl alcohol. Examples of the polyhydric alcohols may include ethylene glycol, propylene glycol, butanediol, glycerin, pentaerithritol, and sorbitol. Examples of the higher fatty acid esters may include steary stearate, pentaerythritol tetrastearate, stearic acid monoglyceride, behenic acid monoglyceride, and montanic acid waxes.

Examples of higher fatty acid amides may include saturated higher fatty amides such as lauric acid amide, palmitic acid amide, stearic acid amide and behenic acid amide; unsaturated higher fatty acid amides such as erucic acid amide, oleic acid amide, brassidic acid amide and elaidic acid amide; and higher fatty acid bisamides such as methylenebisstearic acid amide, ethylenebisstearic acid amide and ethylenebisoleic acid amide. (They also include saturated or unsaturated alkyl amides such as higher fatty acid methylamide and higher fatty acid ethylamide.)

The amount of any of these higher fatty acids, higher fatty acid esters and higher fatty acid amides blended is usually from 1 to 10% by volume, preferably 3 to 7% by volume. When the amount of any of the above additive components blended is less than 1% by volume, it may be hardly possible to obtain the aimed effect of decreasing coefficient of friction and improving moldability. When the amount of any of the above additive components blended exceeds 10% by volume, the resultant solid lubricant tends to deteriorate in moldability and may also prove low in strength.

The metallic soap used as still another additive component in the present invention takes part in the formation of the insular phase dispersed in the sea phase and also has the effects of reducing coefficient of friction and improving thermal stability of the lubricant. This metallic soap is a salt of above-mentioned higher fatty acid with alkali metal or alkali earth metal. Examples of the metallic soap may include lithium stearate and calcium stearate. The amount of metallic soap blended is usually from 3 to 20% by volume, preferably from 5 to 15% by volume. When the amount of the metallic soap is less than 3% by volume, it may be difficult to obtain the aimed effect of decreasing friction coefficient and improving thermal stability. When the amount of the metallic soap blended exceeds 20% by volume, the resultant solid lubricant may deteriorate in moldability.

The phosphates used as an additive component also participate in the formation of the insular phase dispersed in the sea phase. Although phosphates per se do not show a lubrication property, they exhibit an effect of promoting the formation of lubrication film on a surface of the mating member upon sliding thereon. As the phosphates, there may be exemplified tertiary phosphates, secondary phosphates, pyrophosphates, phosphites and metaphosphates of alkali metals or alkali earth metals. Examples of the phosphates may include trilithium phosphate, dilithium hydrogenphosphate, lithium pyrophosphate, tricalcium phosphate, calcium monohydrogenphosphate, calcium pyrophosphate, lithium metaphosphate, magnesium metaphosphate and calcium metaphosphate. The amount of phosphates blended is usually from 3 to 15% by volume, preferably from 5 to 10% by volume. When the amount of the phosphates blended is less than 3% by volume, the phosphates may fail to exhibit a sufficient effect of promoting the formation of lubrication film on the surface of the mating member. When the amount of phosphates blended exceeds 15% by volume, the amount of lubrication film transferred and attached on the surface of the mating member may prove excessively large, rather causing a reduction of wear resistance.

The polytetrafluoroethylene resins used as an additive component in the present invention are the high molecular weight polytetrafluoroethylene resins (hereinafter referred to as "high molecular weight PTFE") which are mainly used for molding as molding powder or fine powder and can be rendered into a fibrous state by applying a shearing force thereto. The high molecular weight PTFE is dispersed in a fine fibrous state in the sea phase and mainly works for affording low friction properties to the solid lubricant while improving its toughness. This high molecular weight PTFE is used in a non-calcined state or in a pulverized state after calcination at a temperature higher than the melting point of the resin. Examples of high molecular weight PTFE may include "TEFLON® 7-J", "TEFLON® 7A-J", "TEFLON® 6-J", "TEFLON® 6C-J", all produced by Du Pont-Mitsui Fluorochemical Co., Ltd.; "POLYFLON M-12™", "POLYFLON F-201™", both produced by Daikin Industries, Ltd.; "FLUON G163™", "FLUON G190™", "FLUON CD076™", "FLUON CD090™", all produced by Asahi Glass Co., Ltd.; and "KT-300M™" produced by Kitamura Limited. Beside those mentioned above, there can also be used high molecular weight PTFE's modified with polymers such as styrene-based polymers, acrylic acid ester-based polymers, methacrylic acid ester-based polymers and acrylonitrile-based polymers. For example, "METABLEN A-3000™" produced by Mitsubishi Rayon Co., Ltd. or the like can be used. The amount of high molecular weight PTFE is usually from 0.5 to 10% by volume, preferably from 0.5 to 5% by volume. When the amount of high molecular weight PTFE blended is less than 0.5% by volume, it is hardly possible to produce the above-mentioned effects. When the amount of high molecular weight PTFE exceeds 10% by volume, the resultant solid lubricant may not only be reduced in wear resistance but may also deteriorate in moldability.

The solid lubricant of the present invention can be produced by mixing the above respective components with each other at a predetermined mixing ratio using a mixer such as a Henschel mixer, a super mixer, a ball mill and a tumbler, and then molding the resultant mixture into a desired shape. The molding method is not particularly limited, but preferably there may be used a method in which the obtained mixture is supplied to an extruder and melt-kneaded therein at a temperature capable of melting the polyamide resins to prepare pellets, and then the obtained pellets are supplied to an injection molding machine and injection molded at a temperature not lower than the melting point of the polyethylene resin used as a binder.

The sliding member of the present invention is produced by embedding the solid lubricant obtained by the above-described process into pores or grooves formed in the sliding surface of the sliding member body composed of a metal or a synthetic resin. Examples of the method of embedding the solid lubricant into pores or grooves formed in the sliding surface of the sliding member body may include a press fitting method and adhesive fitting method in which an adhesive is applied on the surface of the molded solid lubricant and fixed in the pores or grooves. According to the sliding member of the present invention, since a film of the solid lubricant embedded in a sliding surface is formed at the sliding surface in sliding with a mating member, the solid lubricant exhibits an effect of alleviating friction even when exposed to repeated frictional contact, thus providing excellent wear resistance. Further, since the solid lubricant embedded in the sliding surface is enhanced in mechanical strength, there is little possibility of giving rise to troubles such as chipping of the solid lubricant in use of the sliding member.

EXAMPLES

The present invention is described in more detail with reference to the Examples thereof, but these Examples are merely intended to be illustrative and not to be construed as limiting the scope of the invention.

Examples 1 and 2

5% by volume, in combined amount, of a low density polyethylene resin ("FLO-THENE"™ produced by SUMITOMO SEIKA CHEMICALS CO., LTD.) and/or a high molecular weight polyethylene resin ("LUBMER"™ produced by Mitsui Chemicals, Inc.) as polyethylene resin, 40% by volume of melamine cyanurate ("MCA™" produced by Mitsui Chemicals, Inc.), 20% by volume of paraffin wax and 20% by volume of polyethylene wax as hydrocarbon-based waxes, 10% by volume of a polyamide resin (nylon-12, "VESTOSINT"™ produced by Daicel-Degussa Co., Ltd.) and 5% by volume of a modified polyethylene resin ("ADMER"™ produced by Mitsui Chemicals, Inc.) were introduced to a Henschel mixer and mixed with each other therein to produce a mixture. The obtained mixture was supplied into an extruder and melt-kneaded therein at a temperature capable of melting the polyamide resin to prepare pellets. Then, the obtained pellets were supplied to an injection molding machine and molded at a temperature causing melting of the polyethylene resin to obtain a cylindrical solid lubricant having a diameter of 6 mm and a length of 5 mm.

Examples 3 to 9

The same procedure as defined in Examples 1 and 2 was conducted except that the composition was changed as shown in Tables 2 and 3, thereby obtaining cylindrical solid lubricants having a diameter of 6 mm and a length of 5 mm.

Comparative Example 1

50% by volume of a linear low density polyethylene resin (LLDPE) as polyethylene resin and 50% by volume of melamine cyanurate were introduced into and mixed by a Henschel mixer, and the obtained mixture was supplied to an extrusion molding machine to prepare pellets. The obtained pellets were supplied to an injection molding machine and molded thereby to obtain a cylindrical solid lubricant having a diameter of 6 mm and a length of 5 mm.

Comparative Example 2

10% by volume of a low density polyethylene resin (LDPE) as polyethylene resin, 13% by volume of paraffin wax as hydrocarbon-based wax, 7% by volume of lithium stearate as metallic soap, 40% by volume of lead, and 30% by volume of a low molecular weight polytetrafluoroethylene resin as polytetrafluoroethylene resin were introduced into and mixed by a Henschel mixer, and the obtained mixture was supplied to an extrusion molding machine to make pellets. Then the obtained pellets were supplied to an injection molding machine and molded into a cylindrical solid lubricant having a diameter of 6 mm and a length of 5 mm.

Comparative Example 3

20% by volume of a low density polyethylene resin (LDPE) as polyethylene resin, 12.5% by volume of paraffin wax and 12.5% by volume of polyethylene wax as hydrocarbon-based waxes, 30% by volume of melamine cyanurate, 5% by volume of a montanic acid wax as higher fatty acid ester, 10% by volume of lithium stearate as metallic soap, 5% by volume of trilithium phosphate as phosphate, and 5% by volume of a high molecular weight PTFE were introduced into and mixed by a Henschel mixer. The obtained mixture was supplied to an extrusion molding machine and melt-kneaded at a temperature capable of melting the hydrocarbon-based waxes to prepare pellets. Then the obtained pellets were supplied to an injection molding machine and molded at a temperature not lower than the melting point of the polyethylene resin to obtain a cylindrical solid lubricant having a diameter of 6 mm and a length of 5 mm.

Comparative Example 4

A mixture comprising the same components as defined in Comparative Example 3 except for use of 20% by volume of a polyamide resin (nylon-12) in place of 20% by volume of polyethylene resin was supplied to an extrusion molding machine and melt-kneaded at a temperature capable of melting the polyamide resin to prepare pellets. Then the pellets were supplied to an injection molding machine and molded at a temperature capable of melting the polyamide resin to obtain a cylindrical solid lubricant having a diameter of 6 mm and a length of 5 mm.

Comparative Example 5

10% by volume of a low density polyethylene resin (LDPE) as polyethylene resin, 20% by volume of paraffin wax and 20% by volume of polyethylene wax as hydrocarbon-based waxes, 40% by volume of melamine cyanurate, and 10% by volume of polyamide resin (nylon-12) were introduced into and mixed by a Henschel mixer to obtain a mixture. The obtained mixture was supplied to an extrusion molding machine and melt-kneaded at a temperature capable of melting the polyamide resin to produce pellets. Then the pellets were supplied to an injection molding machine and molded at a temperature not lower than the melting point of the polyethylene resin to obtain a cylindrical solid lubricant having a diameter of 6 mm and a length of 5 mm.

The solid lubricants obtained from the above-described Examples and Comparative Examples were embedded in pores formed in the sliding surface of a plane body made of a copper alloy to prepare the sliding member test specimens. These test specimens were subjected to a thrust test under the conditions shown in Table 1 to determine coefficient of friction and amount of wear. Also, compressive strength (N/mm$^2$) was determined as a measure of mechanical properties of the solid lubricants. The results of the thrust test and the results of determination of compressive strength are shown in Table 2 to 4.

TABLE 1

| Material of test specimen | High strength brass fourth-class casting |
|---|---|
| Material of mating member | Stainless steel (SUS304) |
| Area ratio occupied by solid lubricant in sliding surface of specimen | 30% |
| Sliding velocity | 1 m/min |
| Load | 29.4 MPa (300 kgf/cm$^2$) |
| Lubrication | None |
| Testing time | 8 hr |

TABLE 2

| Example | 1 | 2 | 3 | 4 | 5 |
|---|---|---|---|---|---|
| Composition |  |  |  |  |  |
| Polyethylene resin |  |  |  |  |  |
| LDPE | 5 | 4 | 4 | 4 | 4 |
| HMWPE | — | 1 | 1 | 1 | 1 |
| Hydrocarbon-based waxes |  |  |  |  |  |
| Paraffin wax | 20 | 20 | 20 | 20 | 20 |
| Polyethylene wax | 20 | 20 | 20 | 20 | 20 |
| Melamine cyanurate | 40 | 40 | 35 | 35 | 35 |
| Polyamide resin |  |  |  |  |  |
| Nylon-12 | 10 | 10 | 10 | 10 | 10 |
| Modified polyethylene resin | 5 | 5 | 5 | 5 | 5 |
| Higher fatty acid |  |  |  |  |  |
| Montanic acid | — | — | 5 | — | — |
| Higher fatty acid ester |  |  |  |  |  |
| Montanic acid wax | — | — | — | 5 | — |
| Higher fatty acid amide |  |  |  |  |  |
| Stearic acid amide | — | — | — | — | 5 |
| Metallic soap |  |  |  |  |  |
| Lithium stearate | — | — | — | — | — |
| Phosphate |  |  |  |  |  |
| Trilithium phosphate | — | — | — | — | — |
| High molecular weight PTFE | — | — | — | — | — |
| Properties |  |  |  |  |  |
| Friction coefficient | 0.10 | 0.09 | 0.09 | 0.09 | 0.09 |
| Wear amount (μm) | 10 | 8 | 8 | 6 | 6 |
| Compressive strength (N/mm$^2$) | 14 | 14 | 14 | 14 | 14 |

TABLE 3

| Example | 6 | 7 | 8 | 9 |
|---|---|---|---|---|
| Composition |  |  |  |  |
| Polyethylene resin |  |  |  |  |
| LDPE | 4 | 5 | 4 | 4 |
| HMWPE | 1 | — | 1 | 1 |
| Hydrocarbon-based waxes |  |  |  |  |
| Paraffin wax | 15 | 15 | 15 | 15 |
| Polyethylene wax | 20 | 20 | 20 | 20 |
| Melamine cyanurate | 35 | 30 | 25 | 24 |
| Polyamide resin |  |  |  |  |
| Nylon-12 | 10 | 10 | 10 | 10 |
| Modified polyethylene resin | 5 | 5 | 5 | 5 |
| Higher fatty acid |  |  |  |  |
| Montanic acid | — | — | — | — |
| Higher fatty acid ester |  |  |  |  |
| Montanic acid wax | — | 5 | 5 | 5 |
| Higher fatty acid amide |  |  |  |  |
| Stearic acid amide | — | — | — | — |
| Metallic soap |  |  |  |  |
| Lithium stearate | 10 | 10 | 10 | 10 |
| Phosphate |  |  |  |  |
| Trilithium phosphate | — | — | 5 | 5 |
| High molecular weight PTFE | — | — | — | 1 |
| Properties |  |  |  |  |
| Friction coefficient | 0.09 | 0.09 | 0.09 | 0.09 |
| Wear amount (μm) | 6 | 4 | 4 | 4 |
| Compressive strength (N/mm$^2$) | 13 | 14 | 14 | 14 |

TABLE 4

| Comparative Example | 1 | 2 | 3 | 4 | 5 |
|---|---|---|---|---|---|
| Composition | | | | | |
| Polyethylene resin | | | | | |
| LDPE | — | 10 | 20 | — | 10 |
| LLDPE | 50 | — | — | — | — |
| Hydrocarbon-based waxes | | | | | |
| Paraffin wax | — | 13 | 12.5 | 12.5 | 20 |
| Polyethylene wax | — | — | 12.5 | 12.5 | 20 |
| Melamine cyanurate | 50 | — | 30 | 30 | 40 |
| Polyamide resin | | | | | |
| Nylon-12 | — | — | — | 20 | 10 |
| Modified polyethylene resin | — | — | — | — | — |
| Higher fatty acid | | | | | |
| Montanic acid | — | — | — | — | — |
| Higher fatty acid ester | | | | | |
| Montanic acid wax | — | — | 5 | 5 | — |
| Higher fatty acid amide | | | | | |
| Stearic acid amide | — | — | — | — | — |
| Metallic soap | | | | | |
| Lithium stearate | — | 7 | 10 | 10 | — |
| Phosphate | | | | | |
| Trilithium phosphate | — | — | 5 | 5 | — |
| PTFE | | | | | |
| Low molecular weight PTFE | — | 30 | — | — | — |
| High molecular weight PTFE | — | — | 5 | 5 | — |
| Lead | — | 40 | — | — | — |
| Properties | | | | | |
| Friction coefficient | Over 0.2 | 0.10 | 0.10 | Over 0.2 | 0.09 |
| Wear amount (μm) | — | 9 | 7 | — | 10 |
| Compressive strength (N/mm$^2$) | 14 | 12 | 10 | 18 | 12 |

As is apparent from the above test results, the solid lubricants of the present invention (Examples 1 to 9) were far higher in compressive strength than that of Comparative Example 3 (the solid lubricant described in Patent Document which had been previously proposed by the present applicant). Also, in the solid lubricants of the present invention, there was admitted no loss of the lubricant embedded in a sliding surface after the test. In contrast, in the case of the solid lubricants of Comparative Examples 3 and 5, it was confirmed that some of the solid lubricants embedded in a sliding surface had suffered a loss such as caused by scratching in the test. Further, as is seen from the sliding properties test results, the sliding member obtained by embedding the solid lubricant of the present invention in a sliding surface of a sliding member body showed excellent sliding properties which are identical to or better than those of the conventional sliding member obtained by embedding the lead-containing solid lubricant in Comparative Example 2. The solid lubricant of the present invention also showed the similar performance in comparison with the solid lubricant described in Patent Document 2. The sliding members having embedded therein the solid lubricants of Comparative Examples 1 and 4 exceeded 0.2 in coefficient of friction in the course of the test, so that their test was suspended.

The invention claimed is:

1. A solid lubricant comprising 1 to 10% by volume of a polyethylene resin, 20 to 60% by volume of a hydrocarbon-based wax, 10 to 60% by volume of melamine cyanurate, 5 to 15% by volume of a polyamide resin, and 2 to 10% by volume of a graft modified polyethylene resin obtained by graft polymerizing a graft monomer to a polyethylene resin.

2. A solid lubricant according to claim 1, wherein the hydrocarbon-based wax is paraffin wax, polyethylene wax, alkylbenzene, micro-crystalline wax, or a mixture of any two or more of them.

3. A solid lubricant according to claim 1, wherein the polyamide resin is polylauryl lactam (nylon-12) and/or polyundecaneamide (nylon-11).

4. A solid lubricant according to claim 1, wherein the graft monomer is an α,β-unsaturated carboxylic acid, an α,β-unsaturated carboxylic acid anhydride, an α,β-unsaturated carboxylic acid derivative, or any two or more of them.

5. A solid lubricant according to claim 1, further comprising as an additional component(s) 1 to 10% by volume of a higher fatty acid, a higher fatty acid ester, a higher fatty acid amide, or any two or more of them.

6. A solid lubricant according to claim 1, further comprising as an additional component 3 to 20% by volume of a metallic soap.

7. A solid lubricant according to claim 1, further comprising as an additional component 3 to 15% by volume of a phosphate.

8. A solid lubricant according to claim 1, further comprising as an additional component 0.5 to 10% by volume of a high molecular weight polytetrafluoroethylene resin.

9. A solid lubricant according to claim 1, which is embedded in pores or grooves formed in a sliding surface of a sliding member body.

10. A sliding member comprising:
a sliding member body, and a solid lubricant as defined in claim 1, which is embedded in pores or grooves formed in the sliding surface of the sliding member body.

* * * * *